United States Patent [19]

Dübal et al.

[11] Patent Number: 5,331,081

[45] Date of Patent: * Jul. 19, 1994

[54] USE OF FLUORINATED AROMATIC POLYAMIDES AS ORIENTATION LAYER FOR LIQUID-CRYSTAL SWITCHING AND DISPLAY DEVICES

[75] Inventors: Hans-Rolf Dübal, Königstein/Taunus, Fed. Rep. of Germany; Mikio Murakami, Kakegawa, Japan; Otto Herrmann-Schönherr, Bensheim; Arnold Schneller, Mainz, both of Fed. Rep. of Germany

[73] Assignee: Hoechst Aktiengesellschaft, Frankfurt am Main, Fed. Rep. of Germany

[ * ] Notice: The portion of the term of this patent subsequent to Mar. 23, 2010 has been disclaimed.

[21] Appl. No.: 849,007

[22] PCT Filed: Nov. 12, 1990

[86] PCT No.: PCT/EP90/01893

§ 371 Date: Apr. 21, 1992

§ 102(e) Date: Apr. 21, 1992

[87] PCT Pub. No.: WO91/08509

PCT Pub. Date: Jun. 13, 1991

[30] Foreign Application Priority Data

Nov. 17, 1989 [DE] Fed. Rep. of Germany ....... 3938209

[51] Int. Cl.$^5$ .................. C08G 69/26; C08G 69/32; C08G 63/44

[52] U.S. Cl. .................. 528/288; 528/310; 528/322; 528/329.1; 528/331; 528/335; 528/344; 528/348; 428/1; 428/474.4; 359/75; 359/78

[58] Field of Search .................. 428/1; 359/75, 78; 528/288, 310, 322, 329.1, 331, 335, 344, 348

[56] References Cited

U.S. PATENT DOCUMENTS

| | | | |
|---|---|---|---|
| 5,084,557 | 1/1992 | Murata et al. | 428/1 |
| 5,101,011 | 3/1992 | Mikami et al. | 528/310 |
| 5,196,501 | 3/1993 | Dübal et al. | 528/331 |

FOREIGN PATENT DOCUMENTS

| | | |
|---|---|---|
| 57-26827 | 2/1982 | Japan . |
| 58-37621 | 3/1983 | Japan . |
| 1073321 | 3/1989 | Japan . |

*Primary Examiner*—John Kight, III
*Assistant Examiner*—P. Hampton-Hightower
*Attorney, Agent, or Firm*—Curtis, Morris & Safford

[57] ABSTRACT

Use of fluorinated aromatic polyamides as orientation layer for liquid crystal switching and display devices Use of substituted aromatic polyamides as orientation layer in liquid crystal switching and display elements is described, in which the polyamides contain structural units of the formula (I)

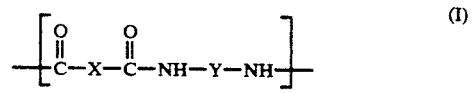

in which in formula I the symbols have the following meaning:

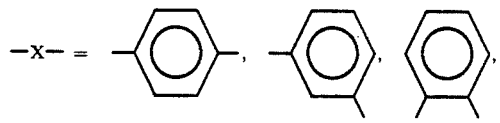

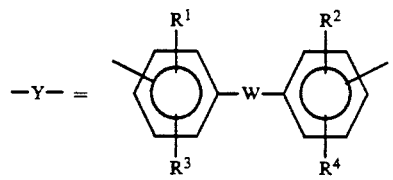

in which $R^1$ and $R^2$ are identical or different and are perfluorinated alkyl having 1 to 4 carbon atoms, $R^3$ and $R^4$ are identical or different and are H or $CF_3$, and in which —W— is, for example, —O—, —C(CH$_3$)$_2$—, —C(CF$_3$)$_2$—.

Orientation layers made of these polyamides can be cured at low temperatures, have good adhesion and high transmittance and allow for a high surface tilt angle.

10 Claims, No Drawings

USE OF FLUORINATED AROMATIC POLYAMIDES AS ORIENTATION LAYER FOR LIQUID-CRYSTAL SWITCHING AND DISPLAY DEVICES

The combination of the unusual anisotropic and fluid properties of liquid crystals has, as is known, led to the use of liquid-crystalline materials in a large number of electro-optical switching and display devices. In these, not only the electrical, magnetic and elastic but also the thermal properties of liquid crystals can be utilized to achieve changes in orientation.

Optical effects can be obtained by means of birefringence ("birefringence mode"), the incorporation of dyes ("guest-host mode") or light scattering. For this purpose, until now not only materials having nematic but also smectic liquid crystal phases have been used. Examples of such switching and display devices have already been disclosed in many patents and technical publications.

Liquid crystal switching and display devices have, inter alia the following constituents: support plates (made, for example, of glass or plastic) coated with transparent electrodes and an orientation layer, spacers, adhesive frame, polarizers, and for color displays thin color filter films. Further possible components are antireflection, passivation, compensating and barrier layers and electrical non-linear elements, such as, for example, thin-film transistors (TFT) and metal-insulator-metal (MIM) elements. The detailed construction of liquid crystal displays has already been described in monographies (for example E. Kaneko, "Liquid Crystal TV Displays: Principles and Applications of Liquid Crystal Displays", KTK Scientific Publishers, 1987, pages 12–30 and 163–172).

Of the abovementioned constituents, the orientation layer is of particular importance. As is known, it serves the purpose of ensuring a uniform, undisturbed alignment of the longitudinal axis of the molecules and of a high contrast. It can comprise either organic polymers or inorganic layers.

For many types of liquid crystal displays, in particular, for "supertwist" (STN), "super-birefringence" (SBE), "double-supertwist" (D-STN), "optical mode interference" (OMI) and also ferroelectric (FLC) displays, it is necessary or advantageous that a certain angle, which is called surface-tilt angle, is established between the longitudinal axis of the molecules and the surface of the orientation layer. Depending on the type of design of the abovementioned displays, angles of up to 30° are desirable.

While up to now a large number of orientation layers having a very small surface-tilt angle (0°–3°) have been described, only very few materials are known which lead to an angle of 5° and more.

An example of an orientation layer having a larger surface-tilt angle, which is well-known to those skilled in the art, is silicon monoxide (SiO) vapor-deposited at an angle, which, as is known gives a surface-tilt angle of 20° and at a vapor deposition angle of 7°. However, due to the high cost and the great expense necessary for achieving homogeneity, the vapor deposition process of silicon monoxide is disadvantageous in the case of large areas.

A further example is the use of poly(para-phenylene) as orientation layer. After heat treatment of the material at about 450° C., high surface-tilt angles can be achieved by this process. However, a great disadvantage of this material is the required application of high temperatures during the production process, which stands in the way of using these orientation layers for color LCDs, since the dyes and pigments already begin to decompose above 250° C.

The organic polymer layers used as orientation layers are usually applied to the areas to be coated (for example support plates) in the form of polymer solutions or solutions of soluble polymer precursors by means of processes under pressure, spray-coating, dip-coating or spin-coating processes, and the wet film is then cured—in general by heating it. To achieve an orientation effect, the hard polymer layer obtained is, "rubbed" with a velvet-like coated roll or a roll lined with velvet, a brush or similar devices, thus toughening the polymer surface preferably in a unidirectional manner.

The object of the invention is to provide suitable orientation layers for liquid crystal switching and display devices which can be cured at relatively low temperatures, i.e. below 250° C., have good adhesion on the support and high transmittance, in which a particularly uniform orientation not only of smectic but also nematic liquid crystals can be achieved and which furthermore have a high surface-tilt angle.

This object is achieved by using the aromatic polyamides described below as orientation layer for liquid crystal displays.

At process temperatures below 250° C., these aromatic polyamides produce surface-tilt angles of more than 5°, if they carry perfluorinated alkyl groups on at least one aromatic ring.

Accordingly the invention relates to the use of aromatic polyamides as orientation layer in liquid crystal switching and display elements, in which the polyamides contain structural units of the formula I $$-\left[-\overset{O}{\underset{\|}{C}}-X-\overset{O}{\underset{\|}{C}}-NH-Y-NH-\right]- \quad (I)$$

The symbols in formula (I) have the following meanings:

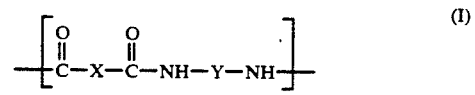

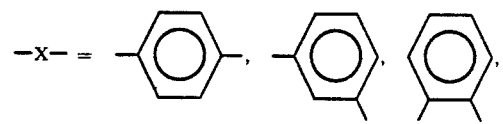

in which $R^1$ and $R^2$ are identical or different and are perfluorinated alkyl having 1 to 4 carbon atoms, $R^3$ and $R^4$ are identical or different and are H or $CF_3$, and in which —W— is —O—, —C(CH$_3$)$_2$—, —C(CF$_3$)$_2$—, —SO$_2$, —CO—, —CH$_2$—, a single bond or the radical

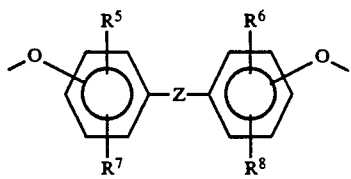

in which $R^5$, $R^6$, $R^7$ and $R^8$ are identical or different and are $CH_3$, $CF_3$, $OCH_3$, F, Cl, Br or H, and —Z— is —$C(CH_3)_2$—, —$C(CF_3)_2$— —$SO_2$—, —CO—, —$CH_2$— or —O—.

The group —X— can furthermore also be a large number of other divalent radicals, since, for example, 1,4-cyclohexanedicarboxylic acid or pyridinedicarboxylic acid can also be used as dicarboxylic acid component, although for economic reasons it is adantageous to use the above-mentioned groups (ortho-, meta-, paraphenylene).

Preference is given to the use of those substituted aromatic polyamides which are composed of identical or different structural units of the formula (I) and in which the symbol Y in formula (I) has the following meaning:

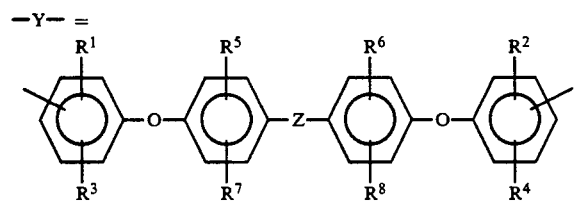

in which
$R^1$, $R^2 = CF_3$,
$R^3$, $R^4 = H$ or $CF_3$,
$R^5$, $R^6$, $R^7$, $R^8 = H$, $CH_3$, or $CF_3$ and
$Z = $ —$C(CH_3)_2$—, —$C(CF_3)_2$—, —O—, or —CO—.

Substituted aromatic polyamides which are composed of structural units of the formula (I) and in which the symbol Y in formula (I) has the following meaning are particularly preferably used:

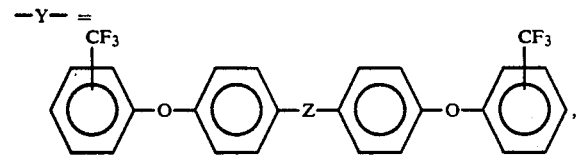

in which $Z = $ —$C(CH_3)_2$—, —$C(CF_3)_2$— or —O—.

Those polyamides which are composed of at least two different structural units of the general formula (I) are also preferably used.

The polyamides according to the invention should preferably be soluble in N-methylpyrrolidone or similar solvents but, on the other hand, should be sparingly soluble in the liquid-crystalline phases.

The solubility of the polyamides is determined by their molecular weight which is characterized by the limiting viscosity ($\eta$). The limiting viscosity of the polyamides according to the invention is 0.3 to 1.5 dl/g. Those of the aromatic polyamides described above which have a limiting viscosity of 0.4 to 1.0 dl/g (in each case measured in NMP at a temperature of 25° C.) are particularly suitable.

The aromatic polyamides described above are valuable materials for liquid crystal switching and display devices (LC displays).

Apart from the customary components already mentioned, such as (two) support plates, (two) electrodes and the liquid-crystalline medium (for example nematic or smectic phase), the LC displays according to the invention contain at least one orientation layer made of an aromatic polyamide, such as described above.

The invention is illustrated in more detail by the examples which follow:

EXAMPLE 1

Preparation of a Polyamide Comprising the Following Structural Units

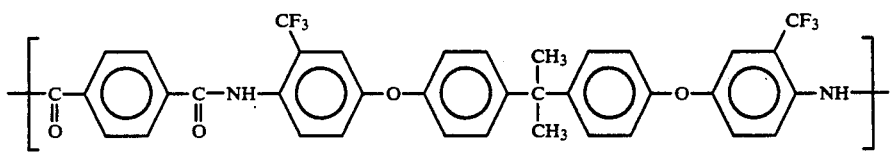

Diamine 1 known from the literature and terephthaloyl dichloride (acid chloride 1) serve as starting components

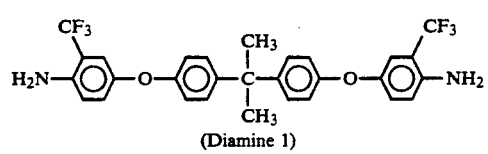
(Diamine 1)

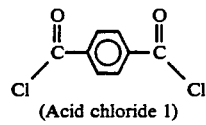
(Acid chloride 1)

In a stirred apparatus, 109.3 g of diamine 1 are dissolved in 1100 g of dry N-methylpyrrolidone (NMP), and 40.6 g of acid chloride 1 are then metered into the solution over a period of one hour with stirring, while heating the mixture at the same time from 15° C. to 70° C. The resulting clear solution is stirred for another hour at 70° C. The polycondensation reactions are preferably carried out according to the invention with a slight diamine excess and, after the reaction is complete, they are stopped by adding a small amount of benzoyl chloride, so that the resulting polymer is preferably composed of linear macromolecular polycondensation polyamides which contain benzoylated amino end groups on both ends of the molecule. The reaction mixture is then neutralized by adding 25 g of CaO and stirred for another hour.

The filtered reaction solution is coagulated with the addition of water, the precipitated polymer is washed several times with water and acetone, then dried under a vacuum (about 50 mbar) and a weak nitrogen stream at a temperature of 180° C. to constant weight. DSC measurements (differential calorimetric measurements) gave a glass-transition temperature ($T_G$) of 175° C. for the polyamide obtained. The limiting viscosity $[\eta]$ of the polyamide is 1.0 dl/g, measured in NMP at a temperature of 25° C.

EXAMPLE 2

Construction of a Test Cell and Measurement of the Surface-Tilt Angle for the Polymer from Example 1

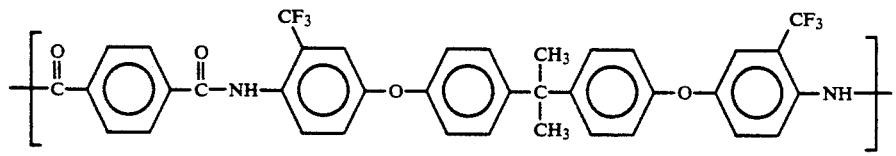

Two glass supports coated with ITO (indium/tin oxide) as conducting-transparent material are cleaned (15 minutes) in an ultrasonic bath using an "Extran APM" solution (manufactured by E. Merck, Darmstadt) in deionized water, then further cleaned with deionized water and isopropanol, follwed by drying) and then coated with a wet film comprising the polymer from Example 1 (3% by weight) and N-methylpyrrolidone (97% by weight) (spin coater at 6000 rpm for 30 seconds). The wet film is then cured at a temperature of 210° C. for 60 minutes, after which the solvent has completely evaporated.

The substrates thus treated contain a dry, hard polymer film of a film thickness of 70 nm. The substrates are then rubbed with a velvet-covered rubbing machine (rotational speed of the roll 300 rpm), rinsed (isopropanol and dichloromethane) and then bonded plane-parallel with one another at a spacing of 9 μm by using spacers, with the directions of rubbing being antiparallel.

The measurement cells thus produced are then filled with a nematic broad-range mixture ("ZLI 1565" from E. Merck, Darmstadt) and used for measuring the surface tilt angle as follows.

To measure the surface tilt angle, first the capacitance $C_o$ of the cell is determined. The cell is brought into a magnetic field of about 10 Kgauss, in which the above-mentioned glass plates are parallel with respect to the magnetic field. The cell is then rotated, and its capacitance as a function of the rotating angle is determined.

The angle at which the capacitance $C_o$ is again just reached corresponds to the surface tilt angle.

An angle of 9° is obtained for the polymer from Example 1.

EXAMPLE 3

Comparison of the Polyamide With Other Polymers

The surface tilt angle of the polymer from Example 1 is contrasted with the surface tilt angle of other polymers. For this purpose, test cells coated with other polymers are also produced—as described in Example 2.

Inter alia, polymers composed of the following repeating units are investigated in test cells:

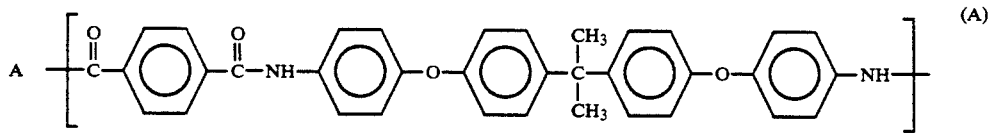

This polymer differs from the polymer according to the invention from Example 1 only by the replacement of both $CF_3$ groups by H atoms.

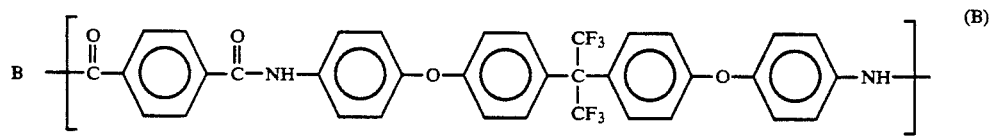

In this polymer, the $CF_3$ groups are bonded to the inner alkyl portion of the diamino components. The polymer (B) has already been described in JP 58/37,621.

The polymers (A) and (B) can be prepared analogously to Example 1.

A comparison of surface tilt angles of the polymers gives the following results:

| | |
|---|---|
| Polymer from Example 1 | 9° |
| Polymer (A) | 2° |
| Polymer (B) | 4° |

EXAMPLE 4

Ferroelectric LCD Cell

As described in Example 2, a cell is constructed with an an electrode spacing of 2.4 μm and parallel directions of rubbing. The polymer from Example 1 is used as orientation layer. The cell is filled with a commercially available ferroelectric liquid crystal test mixture. It can now be observed that the undesired dislocated zig-zag lines which are always present on normal surfaces (having small surface tilt angles) and which reduce the contrast are no longer present. The high surface tilt angle results in one chevron direction being energetically preferred, so that an FLC specimen is obtained which has monocrystalline order instead of polycrystalline order. Thus, it is clear that the high surface tilt angle of the polymers also occurs in FLC displays and can be used advantageously for improving the contrast.

EXAMPLE 5

In accordance with the procedure from Example 1, a polyamide composed of the structural units

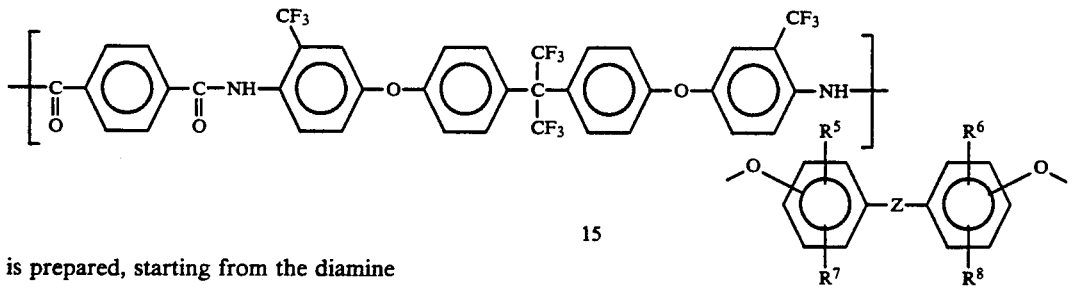

is prepared, starting from the diamine

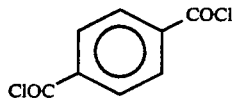

and the acid chloride

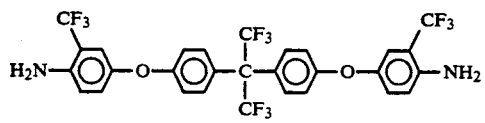

Test cells are constructed using the procedure described in Example 2, and the surface tilt angle was determined for a nematic liquid crystal mixture ("ZLi 1565", E. Merck, Darmstadt) and found to be 3.3°.

We claim:

1. An orientation layer in liquid crystal switching and display elements, comprising a fluorinated aromatic polyamide, which polyamide contains structural units of the formula I

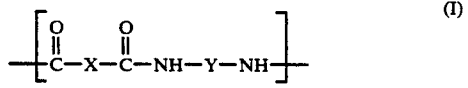 (I)

the symbols in formula I having the following meaning:

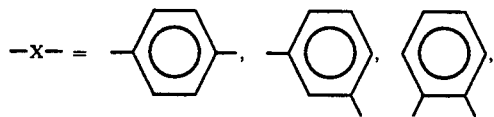

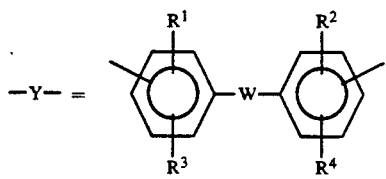

in which $R^1$ and $R^2$ are identical or different and are perfluorinated alkyl having 1 to 4 carbon atoms, $R^3$ and $R^4$ are identical or different and are H or $CF_3$, and in which —W— is —O—, —C(CH$_3$)$_2$—, —C(CF$_3$)$_2$—, —SO$_2$—, —CO—, —CH$_2$—, a single bond or the radical

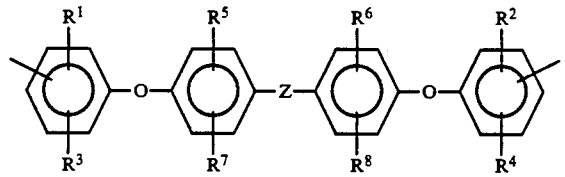

in which $R^5$, $R^6$, $R^7$ and $R^8$ are identical or different and are CH$_3$, CF$_3$, OCH$_3$, F, Cl, Br or H, and —Z— is —C(CH$_3$)$_2$—, —C(CF$_3$)$_2$—, —SO$_2$—, —CO—, —CH$_2$— or —O—.

2. The orientation layer as claimed in claim 1, in which the fluorinated aromatic polyamide is composed of identical or different structural units of the formula (I) and the symbol Y in formula (I) has the following meaning:

—Y— is

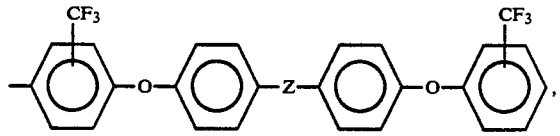

in which
$R^1$, $R^2$ = CF$_3$,
$R^3$, $R^4$ = H or CF$_3$,
$R^5$, $R^6$, $R^7$, $R^8$ = H, CH$_3$, or CF$_3$ and
Z = —C(CH$_3$)$_2$—, —C(CF$_3$)$_2$—, —O—, or —CO—.

3. The orientation layer as claimed in claim 1, in which the fluorinated aromatic polyamide is composed of structural units of the formula (I) and the symbol Y in formula (I) has the following meaning:

—Y— is

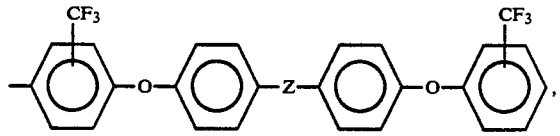, in which Z = —C(CH$_3$)$_2$—, —C(CF$_3$)$_2$— or —O—.

4. The orientation layer as claimed in claim 1, in which the fluorinated aromatic polyamide is composed of at least two different structural units of the formula (I).

5. The orientation layer as claimed in claim 2, in which the fluorinated aromatic polyamide is composed of at least two different structural units of the formula (I).

6. The orientation layer as claimed in claim 3, in which the fluorinated aromatic polyamide is composed of at least two different structural units of the formula (I).

7. A liquid crystal switching and display device comprising two support plates coated with transparent electrodes and orientation layers and a liquid crystalline medium filled between said support plates, wherein at least one orientation layer is an orientation layer as claimed in claim 1.

8. A liquid crystal switching and display device comprising two support plates coated with transparent electrodes and orientation layers and a liquid crystalline medium filled between said support plates, wherein at least one orientation layer is an orientation layer as claimed in claim 2.

9. A liquid crystal switching and display device comprising two support plates coated with transparent electrodes and orientation layers and a liquid crystalline medium filled between said support plates, wherein at least one orientation layer is an orientation layer as claimed in claim 3.

10. A liquid crystal switching and display device comprising two support plates coated with transparent electrodes and orientation layers and a liquid crystalline medium filled between said support plates, wherein at least one orientation layer is an orientation layer as claimed in claim 4.

* * * * *